(12) United States Patent
Anderson et al.

(10) Patent No.: US 7,579,980 B2
(45) Date of Patent: Aug. 25, 2009

(54) RADAR BASED GROUND VEHICLE COLLISION PREVENTION

(75) Inventors: David M. Anderson, Issaquah, WA (US); Aydin Akdeniz, Redmond, WA (US); David L. Banks, Bellevue, WA (US); William J. Renton, Kent, WA (US); Robert L. Avery, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 21 days.

(21) Appl. No.: 11/941,370

(22) Filed: Nov. 16, 2007

(65) Prior Publication Data

US 2008/0172178 A1 Jul. 17, 2008

Related U.S. Application Data

(62) Division of application No. 10/955,818, filed on Sep. 30, 2004, now Pat. No. 7,379,165.

(51) Int. Cl.
*G01S 13/93* (2006.01)

(52) U.S. Cl. .............................. 342/70; 342/29; 342/71; 701/301; 340/903; 340/945; 340/435; 340/436; 340/961

(58) Field of Classification Search .................. 342/29, 342/30, 36, 42, 43, 46, 125; 701/301; 340/903, 340/945, 961, 435, 436
See application file for complete search history.

(56) References Cited

U.S. PATENT DOCUMENTS

| | | | |
|---|---|---|---|
| 3,360,775 A | 12/1967 | Schroeder | |
| 5,249,157 A | 9/1993 | Taylor | |
| 5,314,037 A | 5/1994 | Shaw et al. | |
| 5,754,123 A | 5/1998 | Nashif et al. | |
| 5,983,161 A | 11/1999 | Lemelson et al. | |
| 6,246,320 B1 | 6/2001 | Monroe | |
| 6,275,773 B1 | 8/2001 | Lemelson et al. | |
| 6,281,786 B1 | 8/2001 | Adachi et al. | |
| 6,594,614 B2 | 7/2003 | Studt et al. | |
| 6,615,138 B1 | 9/2003 | Schiffmann et al. | |
| 6,784,791 B2 | 8/2004 | Rao et al. | |
| 6,794,987 B2 | 9/2004 | Schiffmann et al. | |
| 7,379,165 B2 * | 5/2008 | Anderson et al. | 356/5.05 |
| 7,495,600 B2 * | 2/2009 | Rees et al. | 342/29 |
| 7,511,612 B1 * | 3/2009 | Monroe | 340/521 |
| 2002/0109625 A1 | 8/2002 | Gouvary | |
| 2006/0007021 A1 | 1/2006 | Konya et al. | |

(Continued)

*Primary Examiner*—John B Sotomayor
(74) *Attorney, Agent, or Firm*—Lee & Hayes, PLLC

(57) ABSTRACT

The present invention comprises systems and methods for preventing collisions between aircraft and ground vehicles. In one embodiment, a system includes a proximity detection unit and a transducer proximate to a selected structural portion of an aircraft, the proximity detection unit being operable to emit ranging signals through the transducer and to receive reflected signals through the transducer to determine the position of an object within a ranging area adjacent to the structural portion. The system further includes an alarm device coupled to the proximity detection unit that is responsive to a signal generated by the proximity detection unit. In another embodiment, a method includes determining a distance between the ground service vehicle and a selected structural portion of the aircraft when the vehicle is positioned in a ranging area about the aircraft. The method further includes generating a proximity alarm based upon the distance.

23 Claims, 9 Drawing Sheets

U.S. PATENT DOCUMENTS

2006/0064245 A1* 3/2006 Gilbert .................. 701/301
2006/0066470 A1* 3/2006 Anderson et al. ............ 342/29
2008/0172178 A1* 7/2008 Anderson et al. ........... 701/301

* cited by examiner

RADAR BASED GROUND VEHICLE COLLISION PREVENTION

CROSS REFERENCE TO RELATED APPLICATIONS

This patent application is a divisional application of co-pending, commonly owned U.S. patent application Ser. No. 10/955,818 entitled "Ground Vehicle Collision Prevention Systems And Methods," filed on Sep. 30, 2004, which application is incorporated herein by reference.

FIELD OF THE INVENTION

This invention relates generally to aircraft ground operations, and more particularly to ground vehicle collision prevention systems and methods.

BACKGROUND OF THE INVENTION

Passenger aircraft generally require the performance of a variety of different tasks following the termination of a specific flight. For example, the aircraft must be refueled, cargo must be unloaded, the cabin of the aircraft must be cleaned, the lavatory wastewater must be removed, and the galley must be re-provisioned, among other tasks. Accordingly, relatively long turnaround times are often encountered in the operation of passenger aircraft, which adversely affects the return on investment for an aircraft operator since the aircraft cannot generate revenue while sitting on the ground. Considerable effort has therefore been devoted to systems and methods for making the aircraft ready for flight in less time.

One conventional method for preparing an aircraft for flight involves the use of a number of special-purpose ground vehicles that may simultaneously perform specific ground service tasks. FIG. 1 is a plan view of a transport aircraft 10 positioned in a parking area 12 at an airport that will be used to describe at least a portion of the ground service vehicles commonly encountered during aircraft service operations. The ground service vehicles generally maneuver about the aircraft 10 to occupy positions about the aircraft 10 in order to perform a specific task related to servicing the aircraft 10. For example, passenger-loading ramps 14 may be maneuvered into position near aircraft exit locations to permit passenger access to the aircraft 10. Cargo loading conveyors 16 may be positioned adjacent to cargo compartment doors to permit cargo to be loaded and unloaded from the aircraft 10. Cabin service vehicles 18 may also be positioned near exit locations in the aircraft 10 to permit the galley to be re-supplied, and to perform other tasks related to maintaining the cabin of the aircraft 10. Fuel service vehicles 20 may be positioned near fuel service ports in order to refuel the aircraft 10. A potable water vehicle 22 and a lavatory service vehicle 24 may be positioned near the aircraft 10 in order supply the aircraft 10 with potable water, and to remove wastewater from the airplane 10. Still other types of ground vehicles may maneuver about the aircraft 10. For example, a tow tractor 26 is generally required to move the aircraft 10 about the parking area 12. Moreover, cargo pallet trains 28 may frequently maneuver about the aircraft 10 so that cargo may be transported from an airport terminal facility to the cargo loading conveyors 16.

Consequently, during the performance of various ground service operations, a plurality of service vehicles may be maneuvering and/or positioned about the aircraft 10. A risk therefore exists that a service vehicle may inadvertently collide with a portion of the aircraft 10 while moving about the aircraft 10. Such a collision may result in significant damage to the aircraft 10, requiring a costly and time-consuming repair before the aircraft 10 is returned to service. Since non-metallic composite components are increasingly replacing conventional metallic structures on passenger aircraft in order to reduce weight, the likelihood that significant damage may result from a ground service vehicle collision has accordingly increased. Moreover, selected portions of the aircraft 10 are particularly susceptible to damage while the aircraft 10 is positioned on the ground. For example, landing gear doors, cargo loading doors and passenger access doors are generally maintained in an open position during ground operations, and may be relatively easily damaged by even a minor collision. Even in cases where damage to the aircraft 10 is less significant, relatively expensive flight delays are often incurred since a mandated inspection of the damaged area must be performed to determine if the damage is within allowable limits.

Accordingly, there is a need for a systems and methods that at least partially prevent a collision between a ground service vehicle and an aircraft.

SUMMARY OF THE INVENTION

The present invention comprises systems and methods for preventing collisions between aircraft and ground vehicles. In one aspect, a ground vehicle collision prevention system includes a proximity detection unit positioned on an aircraft and coupled to at least one transducer proximate to at least one selected structural portion of the aircraft. The proximity detection unit is operable to emit ranging signals through the at least one transducer and to receive reflected signals through the at least one transducer to determine the position of an object within a ranging area adjacent to the selected structural portion. The system further includes at least one alarm device coupled to the proximity detection unit that is responsive to a proximity alarm signal generated by the proximity detection unit. In another aspect of the invention, a method of preventing a collision between an aircraft and a ground service vehicle includes determining a distance between the ground service vehicle and a selected structural portion of the aircraft when the vehicle is positioned in a ranging area about the aircraft. The method further includes generating a proximity alarm based upon the distance.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to ground vehicle collision prevention systems and methods. Many specific details of certain embodiments of the invention are set forth in the following description and in FIGS. 2 through 7 to provide a thorough understanding of such embodiments. One skilled in the art, however, will understand that the present invention may have additional embodiments, or that the present invention may be practiced without several of the details described in the following description.

Figure 2:
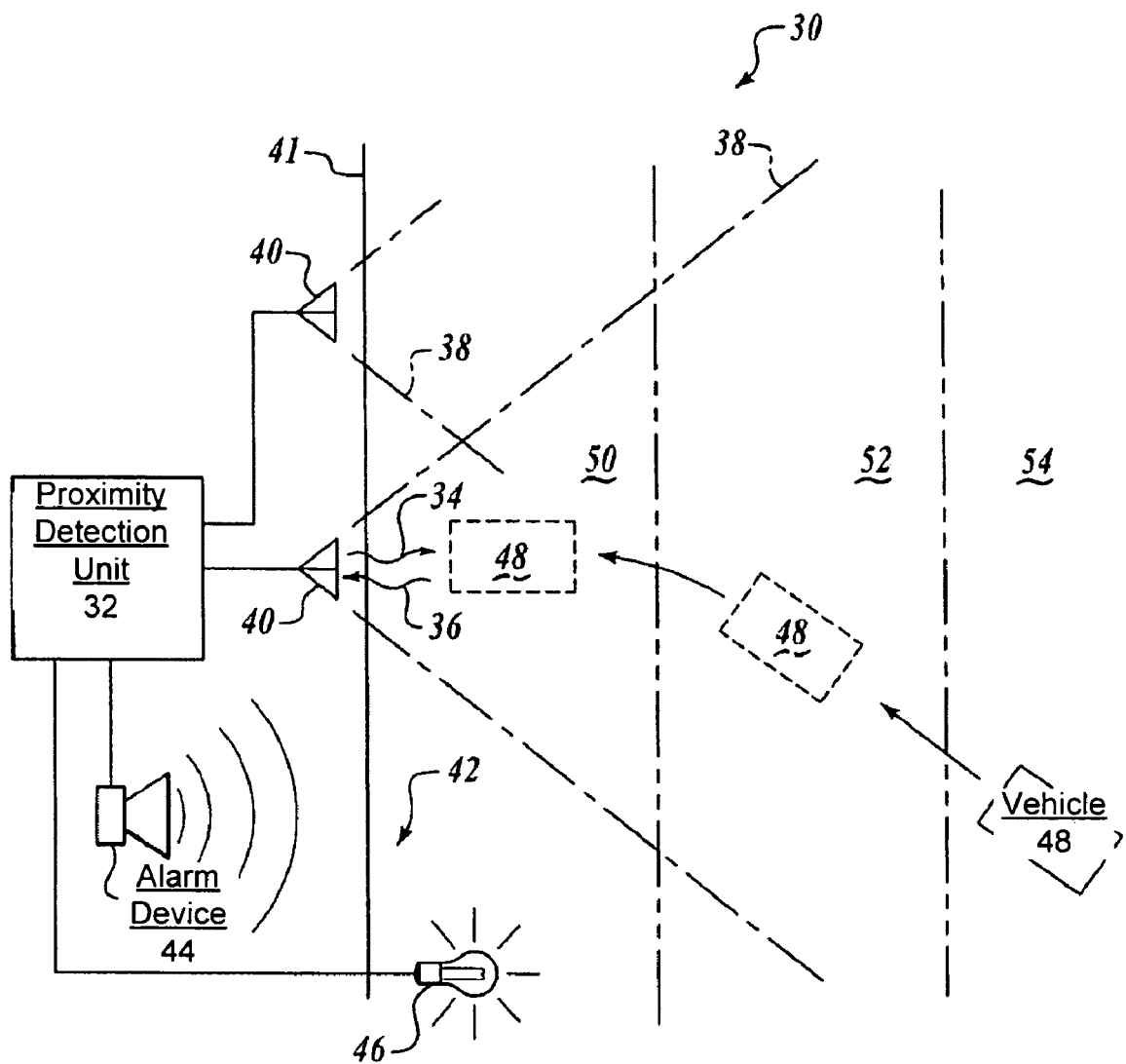
FIG. 2a is a block diagrammatic view of an alternative ground vehicle collision prevention system according to another embodiment of the invention.

FIG. 2 is a block diagrammatic view of a ground vehicle collision prevention system 30 according to an embodiment of the invention. The system 30 includes a proximity detection unit 32 operable to generate ranging signals 34 and to detect return signals 36 reflected from objects positioned within a ranging area 38. The proximity detection unit 32 is further coupled to at least one transducer 40 (two shown) that is positioned proximate to an aircraft structural portion 41. The aircraft structural portion 41 may comprise a skin portion of a fuselage of an aircraft, or other portions coupled to the fuselage, such as a passenger or a cargo door. The portion 41 may also comprise a portion of at least one wing coupled to the fuselage. Moreover, aircraft structural portion 41 may comprise a structure that protrudes from fuselage, such as a drain mast, Pitot tube, or other similar structures. The proximity detection unit 32 may be positioned on the aircraft, or may be positioned proximate to the aircraft on a temporary support that is placed near the aircraft when the aircraft is parked on the ground.

The at least one transducer 40 is operable to emit the ranging signals 34 and to collect the return signals 36. Accordingly, and in a particular embodiment, the proximity detection unit 32 and the at least one transducer 40 may comprise a radio frequency detection and ranging apparatus (RADAR) operating at microwave frequencies. Alternately, and in another particular embodiment, the unit 32 and the at least one transducer 40 may comprise an ultrasonic detection and ranging apparatus, wherein the transducer 40 is configured to emit ranging signals 34 at ultrasonic frequencies, and also receive ultrasonic return signals 36. In other particular embodiments, the proximity detection unit 32 and the at least one transducer 40 may comprise a light-based detection and ranging apparatus (LIDAR) using a photo-emitter and a photo-detector, or an electromagnetic detection and ranging device that relies on inductive effects to detect an object positioned within the ranging area 38, although other detection and ranging apparatus are known to those skilled in the art.

The system 30 further includes at least one alarm device 42, which may include an audio alarm device 44 and a visual alarm device 46. The audio alarm device 44 and the visual alarm device 46 are operable to generate acoustic energy and light, respectively, corresponding to an alarm signal generated by the proximity detection unit 32. The at least one alarm device 42 may be positioned remotely from the proximity detection unit 32 so that the acoustic energy and light corresponding to the alarm signal may be perceived within the ranging area 38. For example, the audio alarm device 40 may comprise a loudspeaker positioned within a wheel well opening of an aircraft, while the visual alarm device 44 may include an incandescent light source positioned on an exterior portion of the aircraft structural portion 41.

Still referring to FIG. 2, the operation of the ground vehicle collision prevention system 30 will now be discussed. The proximity detection unit 32 generates ranging signals 34 that are reflected from a ground service vehicle 48 positioned within the ranging area 38 to yield return signals 36. Accordingly, a distance between the aircraft structural portion 41 and the ground service vehicle 48 may be determined by measuring a time delay between the emission of the ranging signal 34 and the detection of the return signal 36, and multiplying the resulting time delay by the propagation speed of the ranging signal 34. Accordingly, for a ranging apparatus that employs electromagnetic emissions, the speed of light is used as the propagation speed, while for an acoustic-based ranging apparatus, an acoustic propagation speed is appropriate. The proximity detection unit 32 may be configured to generate alarm signals depending on the distance between the aircraft structural portion 41 and the ground service vehicle 48.

In one particular embodiment, the ranging area 38 may be sub-divided into a near field region 50, an intermediate field region 52, and a far-field region 54 so that the proximity detection unit 32 generates a first alarm signal 67 having a first alarm signal characteristic 69 when the ground service vehicle 48 is positioned in the near field region 50, a second alarm signal 71 having a second alarm signal characteristic 73 when positioned in the intermediate field region 52, and a third alarm signal (not shown) having a third alarm signal characteristic (not shown) when the ground service vehicle 48 is positioned in the far field region 54. The first, second and third signal characteristics may be selected to provide an operator of the vehicle 48 with a distinct and readily recognizable aural or visual indication that reflects the distance between the vehicle 48 and the aircraft structural portion 41. In another particular embodiment, the first signal characteristic includes a steady audible tone having a frequency of approximately 3000 Hz, the second signal characteristic includes an intermittent audible tone having a first repetition rate and a frequency of approximately 1500 Hz, while the third signal characteristic includes an intermittent audible tone having a second repetition rate and a frequency of approximately 500 Hz. Thus, as the vehicle 48 moves from the far-field region 54 to the near field region 50, the operator of the vehicle 48 perceives a succession of different aural indications that vary in frequency and repetition rate.

Still other alarm signal characteristics may be employed to provide the operator of the vehicle 48 with an aural indication of the distance between the vehicle 48 and the aircraft structural portion 41. For example, the proximity detection unit 32 may be configured to generate a plurality of audible sounds, so that a distinct sound applies to a selected portion of the aircraft structure. For example, an intermittent audible tone having a pulse duration that is continuously frequency modulated from approximately 2500 Hz to approximately 1500 Hz is readily recognizable as a "chirp" which may correspond to a first selected aircraft structural portion, while another intermittent audible tone with a pulse duration that is step-wise frequency modulated from approximately 1500 Hz to approximately 1000 Hz is readily recognizable as a "cuckoo" which may correspond to a second selected aircraft structural portion. Having different distinct sounds assigned to different portions of the aircraft structure may advantageously assist operators of different vehicles approaching different portions of the aircraft structure to discriminate between warning signals.

In another particular embodiment, the proximity detection unit 32 of FIG. 2 may be configured with a voice synthesis apparatus operable to generate a verbal alarm signal characteristic, which advantageously may also provide a verbal indication of the location of the system 30. For example, the voice synthesis apparatus may be configured to generate a verbal alarm signal such as "REAR CARGO DOOR-CAUTION" when the vehicle 48 is positioned in the intermediate field region 52 and generate a verbal alarm signal such as "REAR CARGO DOOR-WARNING" when the vehicle 48 moves into the near field region 50.

Figure 2A:
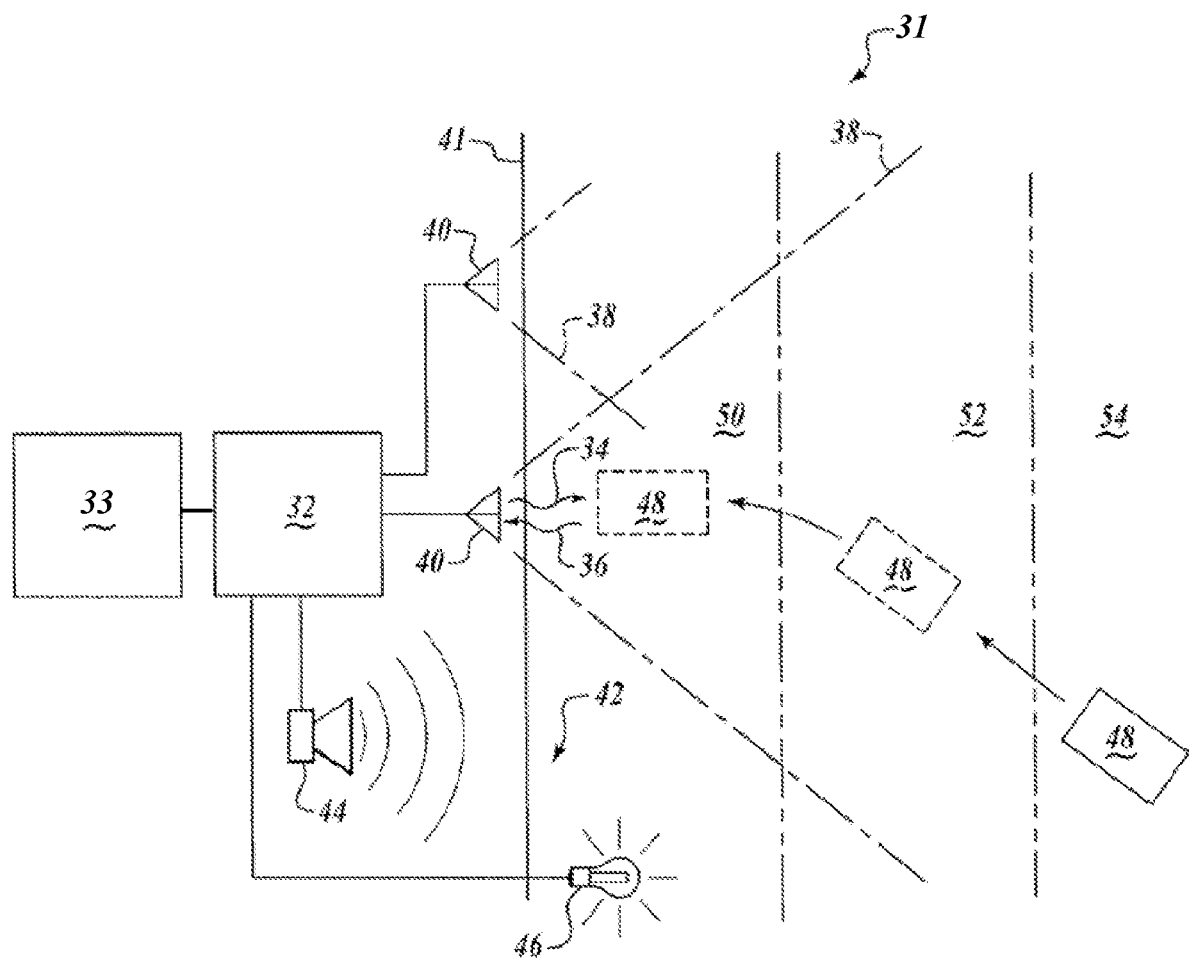

FIG. 2a is a block diagrammatic view of an alternative ground vehicle collision prevention system 31 according to another embodiment of the invention. The system 31 includes a second proximity detection unit 33, in communication with the proximity detection unit 32, operable to generate ranging signals 34 and to detect return signals 36 reflected from objects positioned within a ranging area 38.

Figure 3:
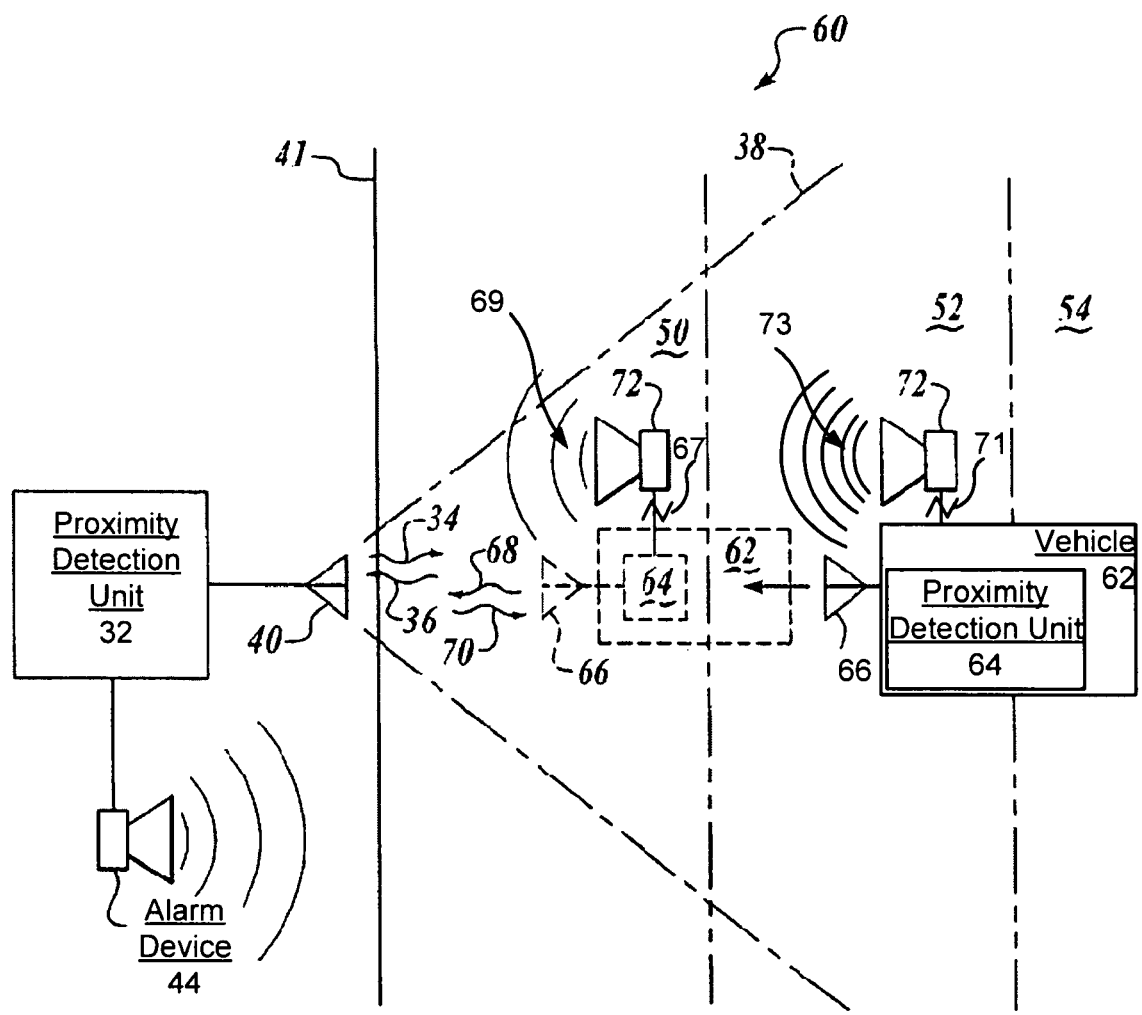
FIG. 3 is a block diagrammatic view of a ground vehicle collision prevention system according to another embodiment of the invention.

FIG. 3 is a block diagrammatic view of a ground vehicle collision prevention system 60 according to another embodiment of the invention. Many of the details of the system 60 have been discussed in detail in connection with previous embodiments, and in the interest of brevity, will not be described further. The system 60 includes a proximity detection unit 32 coupled to at least one transducer 40 that is positioned proximate to an aircraft structural portion 41. The transducer 40 emits the ranging signals 34 generated by the proximity detection unit 32 and collects the return signals 36 reflected from a ground service vehicle 62. In this embodiment, a ground service vehicle 62 includes a proximity detection unit 64 that is coupled to at least one transducer 66 that is positioned on a portion of the vehicle 62 that emits ranging signals 68 generated by the proximity detection unit 64 and to collect return signals 70 reflected from the aircraft structural portion 41. The proximity detection unit 64 is also configured to generate alarm signals depending on the distance between the aircraft structural portion 41 and the ground service vehicle 62, which may be communicated to an audio alarm device 72, although a visual alarm device (not shown in FIG. 3) may also be present.

The foregoing system 60 provides two independent proximity detection units that advantageously provide redundancy. As a result, if a failure occurs in either the proximity detection unit 32 or the proximity detection unit 64, or in any of the components associated with the proximity detection unit 32 or the proximity detection unit 64, the collision avoidance capabilities afforded by the system 60 remain intact. This capability may be important when power has been removed from the aircraft, or a failure has occurred in the proximity detection unit 32. The foregoing system 60 has further advantages. For example, if the transducer 40 is inadvertently obstructed and cannot exchange the signals 30 and 36 with the vehicle 62, the proximity detection unit 64 and the transducer 66 on the vehicle 62 may remain operational to provide the desired collision avoidance awareness to an operator of the vehicle 62.

Figure 4:
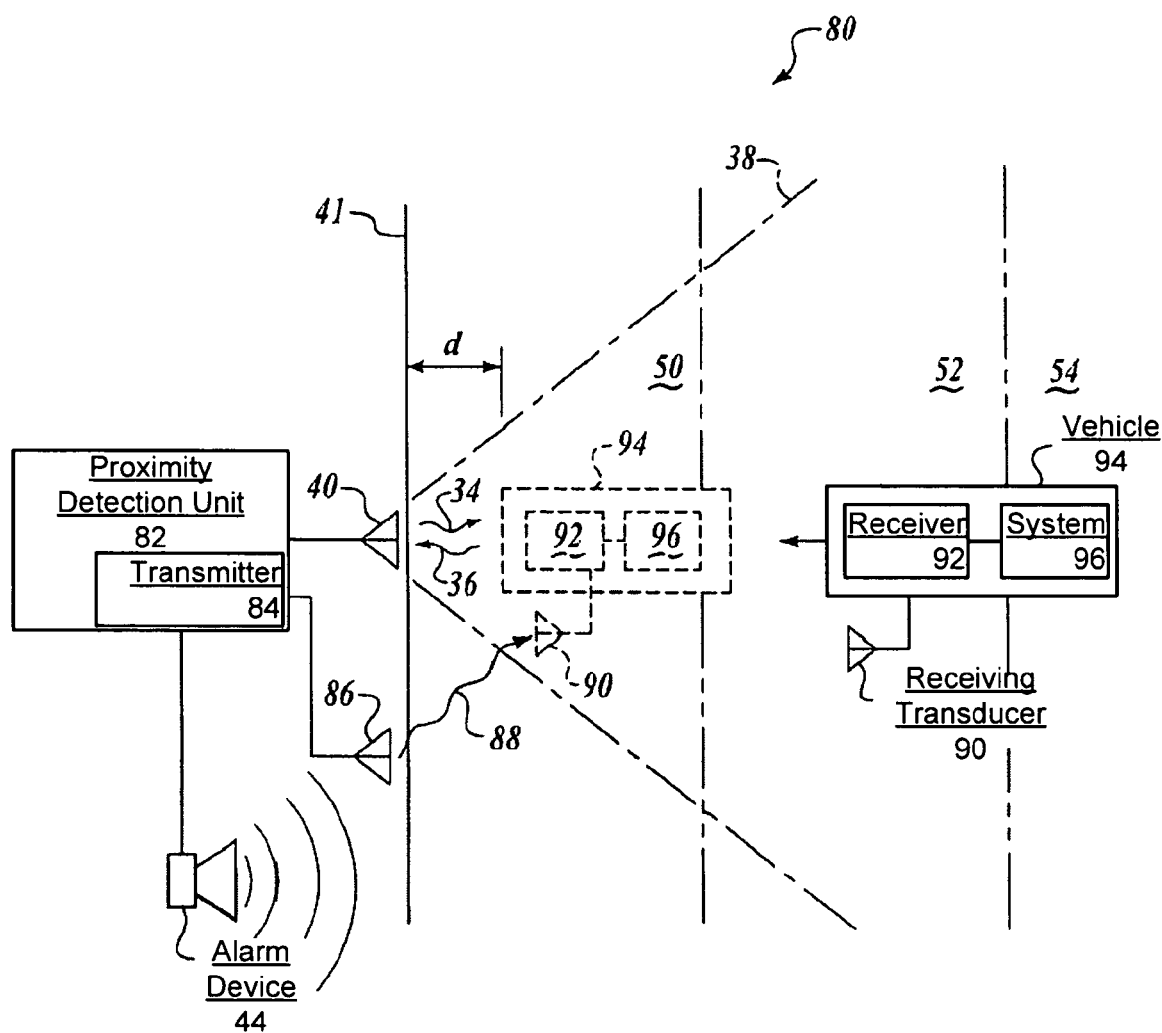
FIG. 4 is a block diagrammatic view of a ground vehicle collision prevention system according to an embodiment of the invention.

FIG. 4 is a block diagrammatic view of a ground vehicle collision prevention system 80 according to still another embodiment of the invention. Many of the details of the system 80 have been discussed in detail in connection with previous embodiments, and in the interest of brevity, will not be described further. The system 80 includes a proximity detection unit 82 operable to generate ranging signals 34 and to detect return signals 36 within the ranging area 38 through at least one transducer 40 that is positioned proximate to the aircraft structural portion 41. The alarm signals generated by the proximity detection unit 82 may be communicated to an audio alarm device 44, or other alarm devices. In this embodiment, the proximity detection unit 82 further includes a control transmitter 84 that is coupled to a control transmitting transducer 86. The control transmitter 84 is further configured to receive alarm signals generated by the unit 82. The control transmitter 84 and the control transmitting transducer 86 are operable to transmit a control signal 88 to a control receiving transducer 90 that is coupled to a control receiver 92 positioned on a ground service vehicle 94. In one particular embodiment, the control transmitter 84 and the control receiver 92 are configured to transmit the control signal 88 wirelessly. In alternate embodiments, a control wire, cable, or other physical connection may be employed. Accordingly, the transmitter 84 may communicate the control signal 88 to the receiver 92 by electromagnetic means, including radio frequency (RF) and light, or by ultrasonic means.

Still referring to FIG. 4, the control receiver 92 is coupled to a control system 96 positioned on the vehicle 94 that is operable to stop movement of the vehicle 94 when the critical proximity signal is received. For example, if the vehicle 94 is an electric powered vehicle, the control system 96 may be configured to interrupt current between an electrical power supply and an electric traction motor in the vehicle 94. Alternately, if the vehicle 96 is powered by a conventional gasoline or diesel engine, the control system 96 may be configured to interrupt the operation of an ignition system, or interrupt a fuel flow to the engine, respectively.

The operation of the system 80 of FIG. 4 will now be described. When the ground service vehicle 94 is positioned within the far field region 54, or within the intermediate field region 52, alarm signals as previously described may be generated by the proximity detection unit 82, which may be relayed to an operator of the vehicle 94 by the audio alarm device 44. When the vehicle 94 moves from the intermediate field region 52 and into the near field region 50, the alarm signal generated by the proximity detection unit 82 again changes, and a corresponding audible signal is relayed to the operator of the vehicle 94 by the audio alarm device 44. At a critical distance "d", a critical alarm signal is generated by the proximity detection unit 82, which is communicated to the control transmitter 84. The control signal 88 is transmitted to the control receiver 92, which, in turn, communicates an appropriate signal to the control system 96 to stop motion of the vehicle 94.

Figure 4A:
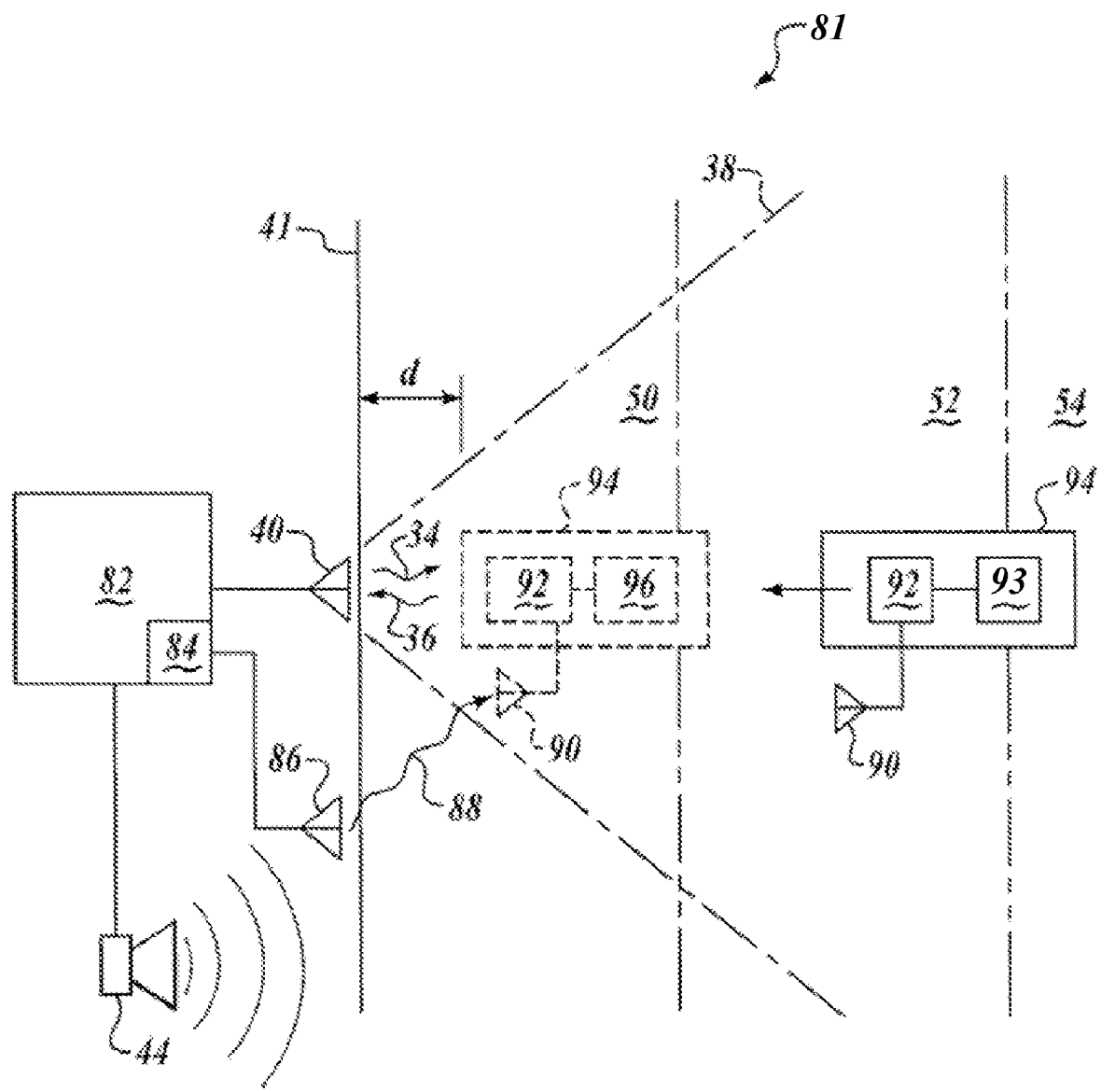
FIG. 4a is a block diagrammatic view of an alternative ground vehicle collision prevention system according to another embodiment of the invention.

FIG. 4a is a block diagrammatic view of an alternative ground vehicle collision prevention system 81 according to another embodiment of the invention. The collision prevention system 81 includes an alternative mechanical control system 93 for controlling the action of the vehicle 94. The control system 93 may be configured to actuate a vehicle braking system in response to receiving the critical proximity signal.

Figure 5:
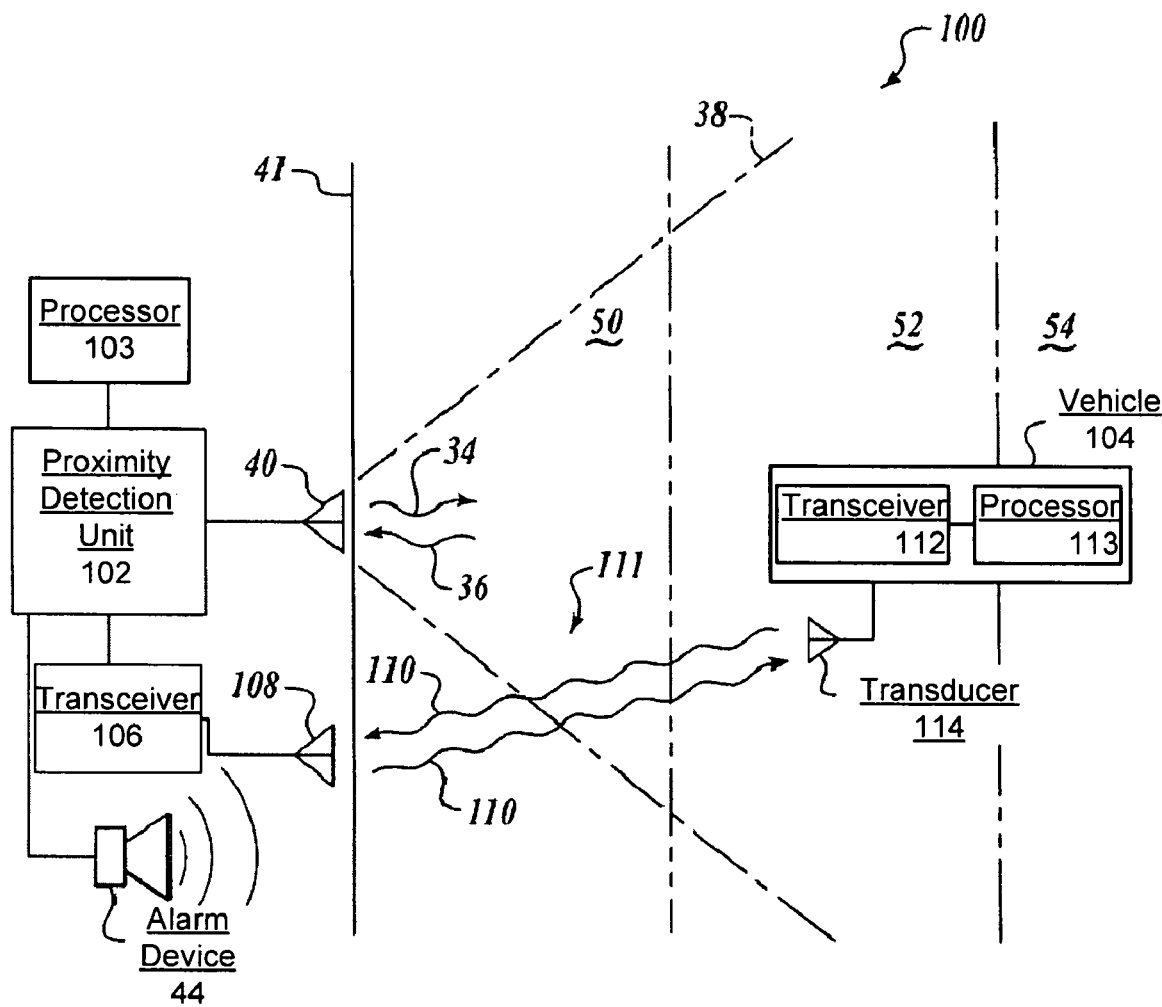
FIG. 5 is a block diagrammatic view of a ground vehicle collision prevention system according to still yet another embodiment of the invention.

FIG. 5 is a block diagrammatic view of a ground vehicle collision prevention system 100 according to still yet another embodiment of the invention. Many of the details of the system 100 have been discussed in detail in connection with previous embodiments, and in the interest of brevity, will not be described further. The system 100 includes a proximity detection unit 102 operable to generate ranging signals 34 and to detect return signals 36 within the ranging area 38 through at least one transducer 40. The alarm signals generated by the proximity detection unit 102 may be communicated to an audio alarm device 44, or other similar alarm devices in order to inform the operator of a ground service vehicle 104. The proximity detection unit 102 further includes an aircraft processor 103 that includes selected information pertaining to the aircraft, as will be discussed in greater detail below.

As further shown in FIG. 5, the proximity detection unit 102 also includes a data link transceiver 106 that is coupled to a data link transducer 108. The data link transceiver 106 and the data link transducer 108 are operable to exchange signals 110 with a corresponding data link transceiver 112 through a data link transducer 114, thus comprising a data link 111 between the proximity detection unit 102 and the vehicle 104. The data link transducer 112 may be coupled to a data link processor 113 that provides data access and other control functions, as will be explained in detail below. In this embodiment, the data link transceiver 106 and the data link transceiver 112 are configured to communicate the signals 110 wirelessly. Accordingly, the data link transceiver 106 and the data link transceiver 112 may communicate the signals 110 by electromagnetic means, including radio frequency (RF) and light, or by ultrasonic means.

Figure 1:
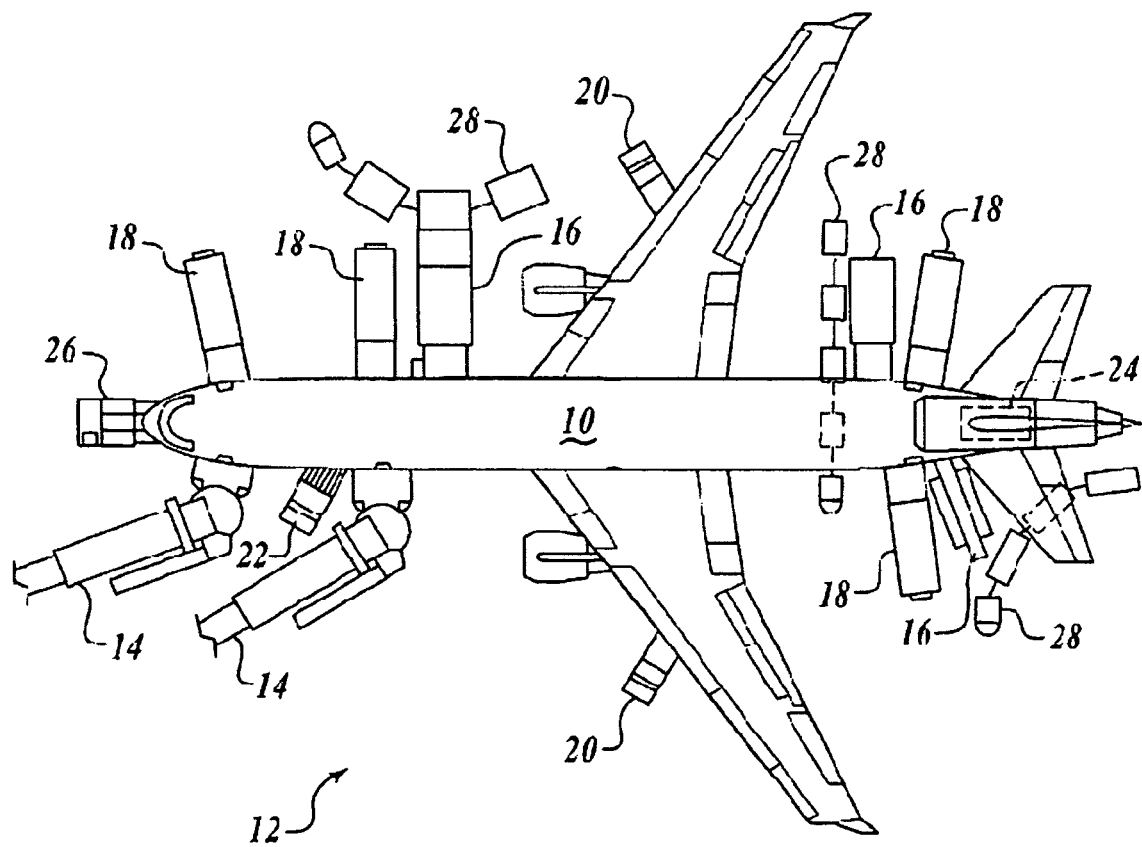
FIG. 1 is a plan view of a transport aircraft positioned in a parking area at an airport in accordance with the prior art; and, FIG. 2 is a block diagrammatic view of a ground vehicle collision prevention system according to an embodiment of the invention.

The operation of the system 100 of FIG. 5 will now be described. As the vehicle 104 approaches the aircraft structural portion 41, the proximity detection unit 102 determines the position of the vehicle 104 in the manner previously described. The data link 111 further assists the vehicle 104 by exchanging information with the proximity detection unit 102. For example, the data link processor 113 may contain a memory device having information regarding the vehicle 104, including vehicle dimensions, which is communicated to the proximity detection unit 102 by the data link 111. The aircraft processor 103 correspondingly contains aircraft-related information, which may include information regarding vehicle compatibility. The proximity detection unit 102 may accordingly alter the locations of the near field region 50, the intermediate field region 52 and the outer field region 54 depending on the information received from the data link processor 113. Alternately, the data link processor 113 may communicate with the proximity detection unit 102 through the data link 111 to determine if the vehicle 104 is compatible with the aircraft on which the proximity detection unit 102 is positioned. For example, if a ground service vehicle such as a cargo-loading conveyor (see FIG. 1) is suitable for use with a Boeing Model 737 airplane, the cargo loading conveyor would identify itself to the proximity detection unit 102 positioned on 737 airplane through the data link 111. The proximity detection unit 102, in turn, accesses the aircraft processor 103 and, assuming the aircraft is a Boeing Model 737, generates a return signal that is transmitted through the data link 111 acknowledging the compatibility. In contrast, if the same conveyor identified itself to a Boeing Model 747 airplane, the conveyor would receive a return signal by means of the data link 111 indicating that the conveyer is not suitable for use with the 747 airplane. An identification of aircraft-ground vehicle compatibility may thus advantageously prevent damage to an aircraft through the use of incompatible equipment.

The ability to communicate signals 110 by means of the data link 111 may afford still other advantages. For example, in still another particular embodiment, the data link 111 may be used to communicate information to the proximity detection unit 102 that includes an identity of an operator of the vehicle 104, and if a collision occurs between the vehicle 104 and the aircraft structural portion 41, the data link 111 may be further employed to communicate the time of the collision and the location of the aircraft structural portion 41.

Figure 6:
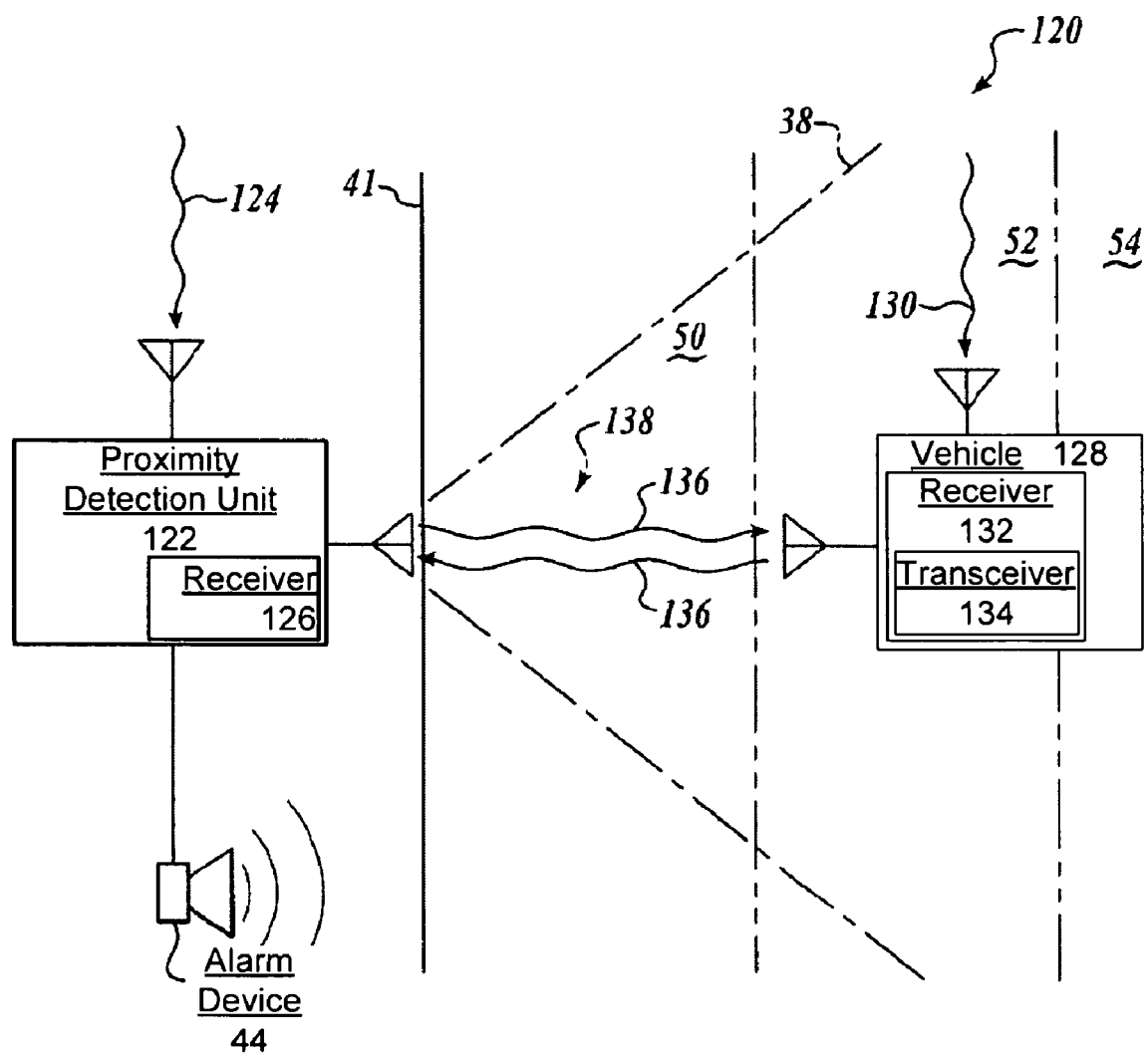
FIG. 6 is a block diagrammatic view of a ground vehicle collision prevention system according to a further embodiment of the invention.

FIG. 6 is a block diagrammatic view of a ground vehicle collision prevention system 120 according to a further embodiment of the invention. The system 120 includes a proximity detection unit 122 operable to receive ground position information 124 through a receiver 126, such as a Ground Positioning System (GPS) receiver. A vehicle 128 is similarly configured to receive ground position information 130 through a receiver 132, which may also be a GPS receiver. The receiver 132 is coupled to a transceiver 134 operable to exchange signals 136 with the proximity detection unit 122, thus forming a data link 138 between the proximity detection unit 122 and the vehicle 128 through which the ground positioning information 124 and the ground positioning information 130 may be exchanged. Accordingly, the ground position information 124 pertaining to the aircraft structural portion 41 and the ground position information 130 of the vehicle 128 may be processed by the proximity detection unit 122 to determine a relative distance between the aircraft structural portion 41 and the vehicle 128, and to generate appropriate alarm signals (or control signals, etc.) as the vehicle 128 moves through the ranging area 38.

Figure 7:
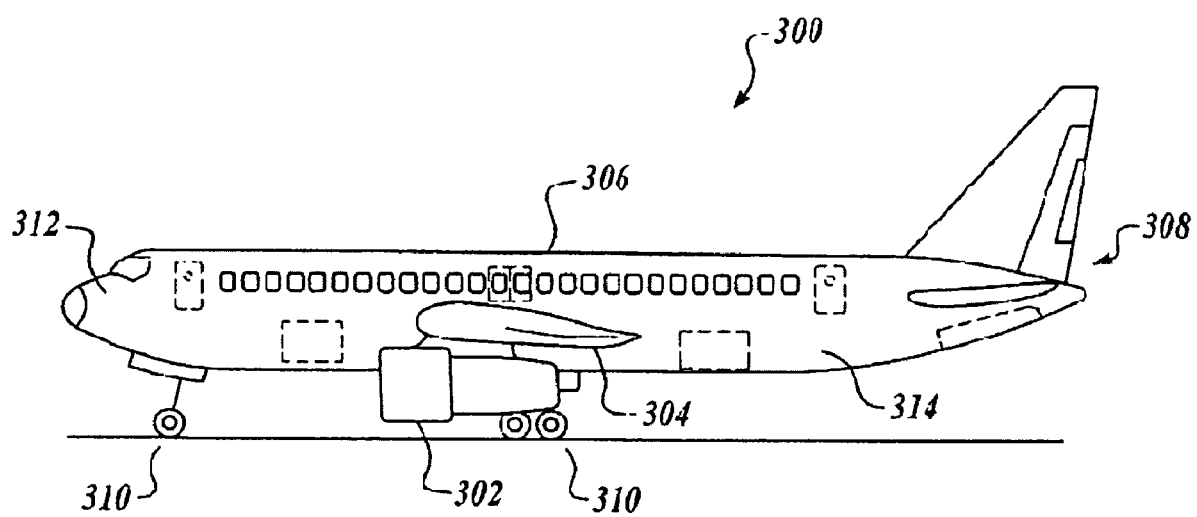
FIG. 7 is a side elevation view of an aircraft having one or more of the disclosed embodiments of the present invention.

Those skilled in the art will also readily recognize that the foregoing embodiments may be incorporated into a wide variety of different systems. Referring now in particular to FIG. 7, a side elevation view of an aircraft 300 having one or more of the disclosed embodiments of the present invention is shown. With the exception of the embodiments according to the present invention, the aircraft 300 includes components and subsystems generally known in the pertinent art, and in the interest of brevity, will not be described further. The aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306. The aircraft 300 further includes other systems and subsystems generally required for the proper operation of the aircraft 300. For example, the aircraft 300 includes a flight control system 312 (not shown in FIG. 7), as well as a plurality of other electrical, mechanical and electromechanical systems that cooperatively perform a variety of tasks necessary for the operation of the aircraft 300. Accordingly, the aircraft 300 is generally representative of a commercial passenger aircraft, which may include, for example, the 737, 747, 757, 767 and 777 commercial passenger aircraft available from The Boeing Company of Chicago, Ill. Although the aircraft 300 shown in FIG. 7 generally shows a commercial passenger aircraft, it is understood that the various embodiments of the present invention may also be incorporated into flight vehicles of other types. Examples of such flight vehicles may include manned or even unmanned military aircraft, rotary wing aircraft, or even ballistic flight vehicles, as illustrated more fully in various descriptive volumes, such as Jane's All The World's Aircraft, available from Jane's Information Group, Ltd. of Coulsdon, Surrey, UK.

With reference still to FIG. 7, the aircraft 300 may include one or more of the embodiments of the ground vehicle collision prevention system 314 according to the present invention, which may operate in association with the various systems and sub-systems of the aircraft 300. Although FIG. 7 shows the one or more embodiments of the ground vehicle collision prevention system 314 as an integral portion of the aircraft 300, one skilled in the art will readily understand that the one or more embodiments of the ground vehicle collision prevention system 314 may also be incorporated into a portable device that may be remotely positioned and separately coupled to the aircraft 300.

While preferred and alternate embodiments of the invention have been illustrated described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A ground vehicle collision prevention system, comprising:
    a proximity detection unit being a radio frequency detection and ranging apparatus (RADAR) positioned at least proximate to an aircraft and coupled to at least one transducer proximate to at least one selected structural portion of the aircraft, the at least one transducer being an antenna suited for use at microwave radio frequencies, the proximity detection unit being operable to emit ranging signals through the at least one transducer and to receive reflected signals through the at least one transducer to determine the position of an object within a ranging area adjacent to the selected structural portion, the ranging area subdivided into at least (1) a first field region adjacent to the at least one selected structural portion, and (2) a second field region adjacent to the first field region and spaced apart from the at least one structural portion, the proximity detection unit is operable to generate:
    a first alarm signal having a first alarm signal characteristic when the object is positioned within the first field region; and
    a second alarm signal having a second alarm signal characteristic when the object is positioned within the second field region.

2. The system of claim 1, wherein the proximity detection unit further comprises at least one alarm device operable to generate at least one of acoustic energy and light energy.

3. The system of claim 1, wherein the ground vehicle collision prevention system further comprises at least one alarm device operable to generate at least one of acoustic energy and light energy, the at least one alarm device positioned remotely from the proximity detection unit such that the acoustic energy and the light energy may be perceived within the ranging area.

4. The system of claim 1, wherein the first alarm signal characteristic includes a first alarm signal intensity and the second alarm signal characteristic includes a second alarm signal intensity.

5. The system of claim 1, wherein the first alarm signal characteristic is a steady audible tone at a first audio frequency and the second alarm signal characteristic is an intermittent audible tone having a first repetition rate at a second audio frequency.

6. The system of claim 1, wherein the first alarm signal characteristic is a verbal signal having a first verbal alarm signal characteristic and the second alarm signal characteristic is a verbal signal having a second verbal alarm signal characteristic.

7. The system of claim 1, further comprising a third field region adjacent to the second field region and spaced apart from the first field region, wherein the proximity detection unit is operable to generate a third alarm signal having a third alarm signal characteristic when the object is positioned within the third field region.

8. The system of claim 7, wherein the first alarm signal characteristic is a steady audible tone at a first audio frequency, the second alarm signal characteristic is an intermittent audible tone having a first repetition rate at a second audio frequency, and the third alarm signal characteristic is an intermittent audible tone having a second repetition rate at a third audio frequency.

9. The system of claim 1, further comprising a third field region adjacent to the second field region and spaced apart from the first field region, wherein the proximity detection unit is operable to generate a third alarm signal having a third alarm signal characteristic when the object is positioned within the third field region, the third alarm signal characteristic including a third alarm signal intensity.

10. A ground vehicle collision prevention system, comprising:
    a proximity detection unit positioned at least proximate to an aircraft and coupled to at least one transducer proximate to at least one selected structural portion of the aircraft, the proximity detection unit being operable to emit ranging signals through the at least one transducer and to receive reflected signals through the at least one transducer, the proximity detection unit being operable to generate a critical proximity alarm signal when a vehicle is positioned within a first field region of a ranging area that is adjacent to the at least one selected structural portion, the proximity alarm signal further including a second proximity alarm signal that is generated when the vehicle is positioned in a second field region of the ranging area that is spaced a predetermined critical distance from the at least one selected structural portion of the aircraft, the proximity detection unit comprising a radio frequency detection and ranging apparatus (RADAR);
    a transmitter coupled to the proximity detection unit to transmit the critical proximity alarm signal to a corresponding receiver positioned in the vehicle; and
    a control system coupled to the receiver to manage a motion of the vehicle when at least one of the critical proximity alarm signal or the second proximity alarm signal is received.

11. The system of claim 10, further comprising at least one of an audio alarm device or a visual alarm device configured to receive the proximity alarm signals.

12. The system of claim 10, wherein the control system manages the motion of the vehicle by interrupting a power supply associated with the motion of the vehicle.

13. The system of claim 10, wherein the control system manages the motion of the vehicle by interrupting a fuel flow between a fuel source and an engine of the vehicle.

14. The system of claim 10, wherein the control system manages the motion of the vehicle by interrupting and electrical energy supply to an ignition system of the vehicle.

15. The system of claim 10, wherein the control system manages the motion of the vehicle by actuating a braking system of the vehicle.

16. The system of claim 10, wherein me control system manages the motion of the vehicle by at least one of: (1) stopping the motion of the vehicle, (2) limiting the motion of the vehicle, or (3) reducing the motion of the vehicle.

17. A method of preventing a collision between an aircraft and a ground service vehicle, comprising:
    determining a distance, via a radio frequency detection and ranging apparatus (RADAR), between the ground service vehicle and a selected structural portion of the aircraft when the vehicle is positioned in a ranging area;
    subdividing the ranging area into at least a first and second field region;
    generating a first alarm signal to an operator of the vehicle, and a control signal to a control system of the vehicle, based upon the distance, when the vehicle is positioned within the first field region; and
    generating a second alarm signal when the vehicle is positioned within the second field region.

18. The method of claim 17, wherein the first alarm signal is at least one of an audible signal or a visual signal and the second alarm signal is at least one an audible signal or a visual signal.

19. The method of claim 17, wherein the generating the first alarm signal comprises generating a steady audible tone at a first audio frequency, and the generating the second alarm signal comprises generating an intermittent audible tone having a first repetition rate at a second audio frequency.

20. The method of claim 17, wherein the first field region is adjacent to the at least one selected structural portions, and further wherein the second field region is adjacent to the first field region and spaced apart from the at least one structural portion.

21. The method of claim 20, wherein subdividing the ranging area into a second field region adjacent to the first field region further comprises subdividing the second field region into a third field region adjacent to the second field region and spaced apart from the first field region, and generating a third alarm signal when the vehicle is positioned within the third field region.

22. The method of claim 17, further comprising generating a third alarm signal when the vehicle is positioned within a third field region of the ranging area, wherein the generating the first alarm signal comprises generating a first alarm signal having a first alarm signal intensity, wherein the generating the second alarm signal comprises generating a second alarm signal having a second alarm signal intensity, and wherein generating the third alarm signal comprises generating an a third alarm signal having a third alarm signal intensity, wherein the first, second, and third, alarm signals are at least one of an audio alarm signal or a visual alarm signal.

23. The method of claim 20, further comprising generating a third alarm signal when the vehicle is positioned within a third field region, the third field region a subdivision of the ranging area adjacent to the second field region and spaced apart from the first field region, wherein the generating the first alarm signal comprises generating a steady audible tone at a first audio frequency, wherein the generating the second alarm signal comprises generating an intermittent audible tone having a first repetition rate at a second audio frequency, and wherein the generating me third alarm signal comprises generating an intermittent audible tone having a second repetition rate at a third audio frequency.

* * * * *